Aug. 18, 1936.   H. T. BOOTH   2,051,026
LUBRICATING SYSTEM FOR AUTOMOBILE ENGINES
Filed Aug. 24, 1932   2 Sheets-Sheet 1

INVENTOR
Harry T. Booth
BY
Kenyon & Kenyon
ATTORNEYS

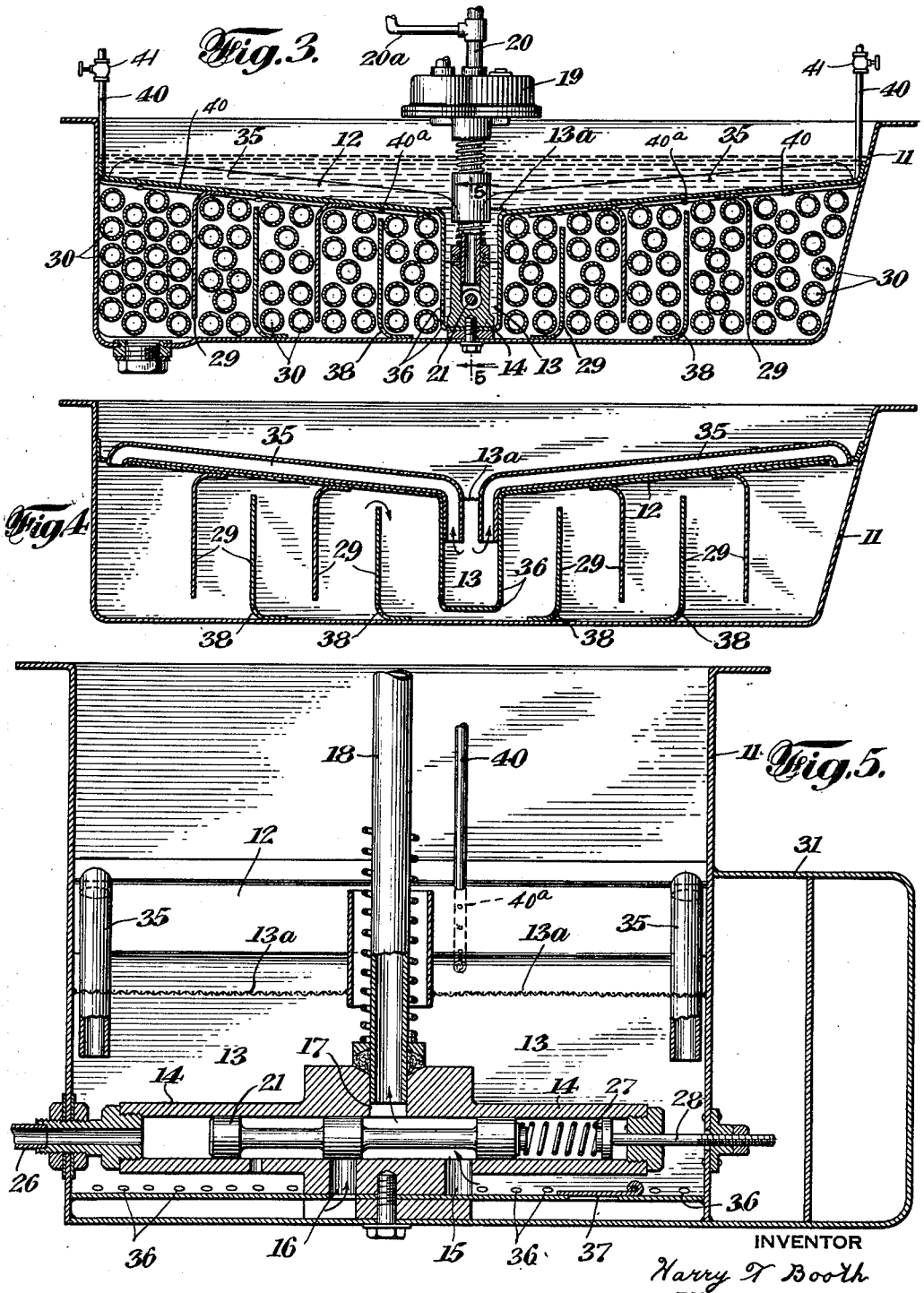

UNITED STATES PATENT OFFICE 2,051,026

LUBRICATING SYSTEM FOR AUTOMOBILE ENGINES

Harry T. Booth, Freeport, N. Y., assignor, by mesne assignments, to Lubrication Control Corporation, Chicago, Ill., a corporation of Delaware Application August 24, 1932, Serial No. 630,172

23 Claims. (Cl. 184—104)

This invention relates to a lubricating system for automobile engines and has for its object an improved lubricating system in which the lubricating oil is supplied to the bearings at uniform viscosity.

In a lubricating system embodying the invention, the oil sump is divided into two chambers which will be referred to as the hot oil sump and the cold oil sump. A valve box is provided having two inlets, one communicating with the cold oil sump and the other with the hot oil sump and is also provided with an outlet port communicating with the inlet of the oil pump by which the oil is supplied to the bearings. A valve actuated in response to the viscosity of the oil supplied to the bearings controls the inlet ports to the valve box and regulates the flow of oil to the valve box from the two sumps. The hot oil sump holds but a minor portion of the lubricating oil while the cold oil sump holds the major portion thereof. At the starting of the engine, when the oil in both sumps is cold and its viscosity is high, the pump draws oil only from the hot oil sump and the circulation of this small amount of oil through the bearings quickly heats the oil to the temperature at which it is of the desired viscosity. As soon as the oil tends to drop below the desired viscosity, the valve is actuated to permit the pump to draw oil from both the cold oil sump and the hot oil sump, thereby holding the oil at the temperature which gives the desired viscosity. Means are provided for returning oil from the bearings to the hot oil sump and also from the hot oil sump to the cold oil sump. Eventually, all the oil in both sumps is put in circulation through the system, the oil being drawn by the pump either entirely from the cold oil sump or in proper ratio from both sumps and supplied to the bearings at the desired viscosity. This arrangement insures almost immediate supply to the bearings of oil of desired viscosity.

Connections are provided between the cold oil sump and the hot oil sump to cause flow of oil from the cold oil sump to the hot oil sump in the event that before the valve is actuated to connect the cold oil sump to the pump, the supply of oil in the hot oil sump is reduced to such an extent as to be insufficient for proper lubrication of the bearings. This arrangement avoids any possibility of burning out of bearings so long as there is oil in the cold oil sump.

Tubes are provided in the cold oil sump and air is caused to pass through these pipes for the purpose of cooling the oil. The motion of the automobile provides the motive force for flowing air through these pipes. In this way, the oil in the cold oil sump is maintained sufficiently cool that the oil supplied to the bearings may be kept at the proper temperature for uniform viscosity.

Preferably a portion of the air tubes discharge into the intake for the carburetor. This arrangement heats the air supplied to the carburetor and also acts as a silencer for the carburetor.

Other objects, novel features and advantages of this invention will be apparent from the following specification and accompanying drawings, wherein:

Fig. 3 is a section on the line 3—3 of Fig. 2;

Fig. 4 is a section similar to Fig. 3 with the valve box and tubes removed;

Fig. 5 is an enlarged section on the line 5—5 of Fig. 3.

Figure 1:
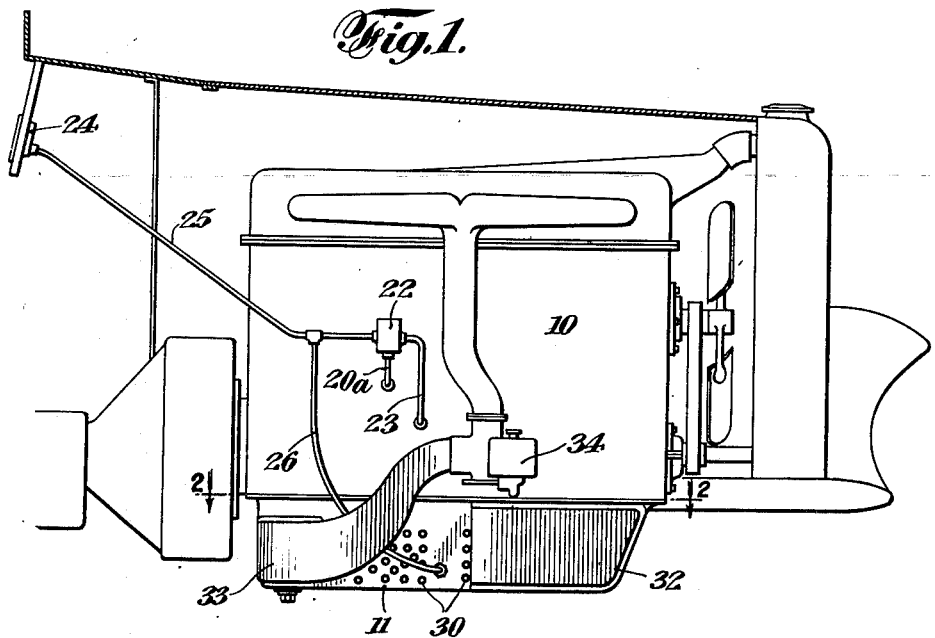
Fig. 1 is a side elevation of an automobile engine equipped with a lubricating system embodying the invention.
Figure 2:
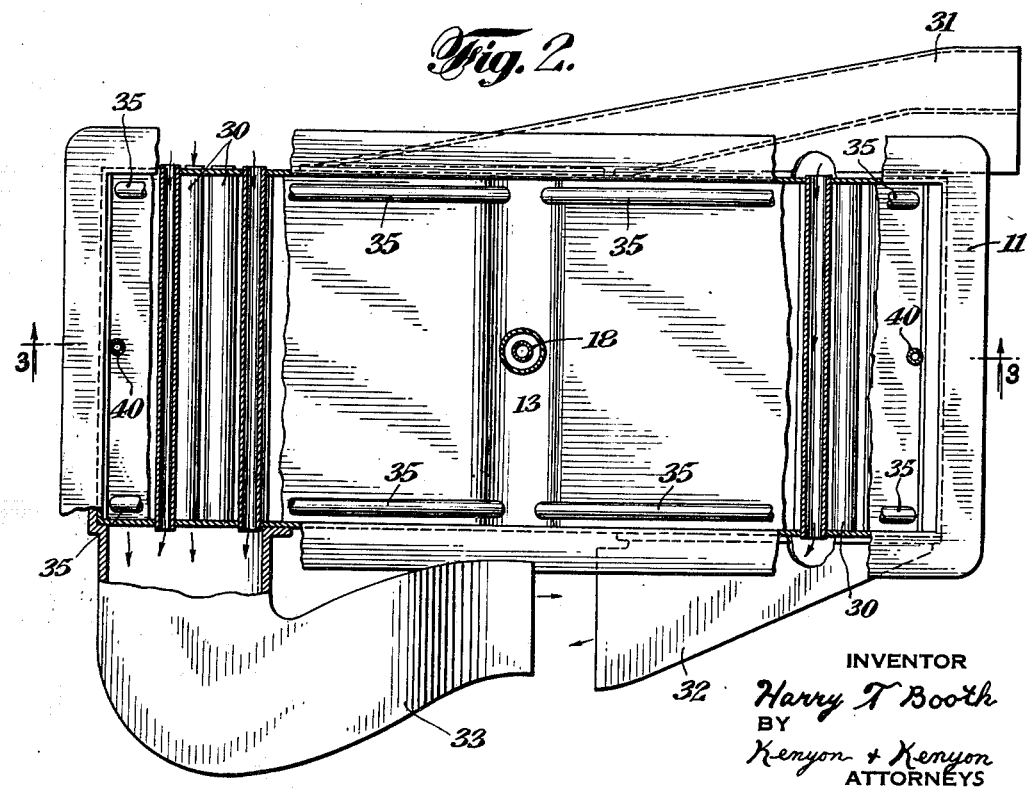
Fig. 2 is a section on the line 2—2 of Fig. 1.

The engine 10 is provided with an oil pan 11 which is divided into upper and lower chambers by a partition 12 having a central well 13. The upper chamber constitutes the hot oil sump and the lower chamber constitutes the cold oil sump. A screen 13a spans the mouth of the well 13. In the bottom of the well 13 there is provided a valve box 14 having an inlet port 15 communicating with the hot oil sump and an inlet port 16 communicating with the cold oil sump. The valve box also has an outlet port 17 communicating through the conduit 18 with the inlet of a pump 19. A pipe 20 leads from the outlet of the pump 19 to the bearings to be lubricated. Within the valve box 14 there is provided a piston valve 21 which is arranged to close off either inlet port with the other inlet port open or to partially close both inlet ports. A viscosity meter 22 of any well-known type is connected to the pipe 20 by a pipe 20a and has an outlet pipe 23 discharging into the oil pan 11. The pressure developed in the viscosity meter 22 during its operation is applied to a gauge 24 through the medium of a pipe 25 leading from the meter to the gauge. A pipe 26 leads from the pipe 25 to the valve box 14 to which it is connected in such manner that the pressure developed in the viscosity meter 22 is applied to one end of the valve 21. A spring 27 bears against the other end of the valve 19 and tends to oppose movement of the valve under the influence of the pressure developed in the viscosity meter as well as to restore the piston to its original position after having been moved from there by the pressure developed in the viscosity meter. An adjusting screw 28 is provided for regulating the pressure exerted by the spring 27.

The cold oil sump is provided with vertical baffles 29 defining a tortuous path from the ends of the oil pan to the well 13. Between the baffles are arranged groups of pipes 30 extending transversely of the oil pan 11 and having their ends open to the atmosphere. Along one side of the pan there is provided an air scoop 31 communicating with one set of ends of the major portion of the pipes 30. A suction hood 32 is provided at the other end of the tubes to assist in flowing air through the tubes. On the forward movement of the automobile the scoop and hood direct air through the tubes 30 for cooling the oil in the cold oil sump. The remaining pipes are not provided with a scoop and discharge into the intake pipe 33 of the carburetor 34.

Pipes 35 lead from the well 13 and pass through the partition 12 near the front and back walls of the oil pan 11. Holes 36 are provided in the vertical walls of the well 13 to permit oil to flow from the cold oil sump into the hot oil sump. These holes are of sufficiently small diameter that cold highly viscous oil will flow through them but slowly. A check valve 37 is also provided to permit flow from the cold oil sump to the hot oil sump. The baffles 29 are provided with similar holes 38 near the bottom of the oil pan. Vent pipes 40 controlled by cocks 41 extend into the cold oil sump near its top with ports 40a between the baffles to allow air to escape during filling with oil (see Fig. 3).

With the motor at rest, the normal level of oil in the tank 11 covers the partition 12 and the pipes 35. Also, with the motor at rest, there is no pressure developed in the viscosity meter 22 and the valve 21 is maintained by the spring 27 in such position that the port 15 is closed and the port 16 is opened. When the engine is started, the viscosity of the oil is high and a high degree of pressure is immediately developed in the viscosity meter 22 which, being applied to the valve 21, moves the same against the action of the spring 26 into the position shown in Fig. 5 with the port 15 opened and the port 16 closed. The pump thus draws oil from the hot sump only. Because of the small amount of oil circulated, it heats up quickly and the viscosity quickly decreases to the desired viscosity. The pressure developed by the viscosity meter drops correspondingly and when the viscosity of the oil supplied to the bearings tends to drop below the desired viscosity, the valve 21 moves to the left under the influence of the spring 27, thereby partially closing the port 15 and opening the port 16 correspondingly. The pump now draws oil from both the cold oil sump and the hot oil sump, the ratio of oil drawn from these sumps depending on the viscosity of the oil delivered to the bearings. Oil from the bearings drips back to the hot oil sump and is partially drawn back to the pump through the port 15, if open, and the remainder is conducted through the pipes 35 to the cold oil sump or it is all returned through the pipes 35 to the cold oil sump if the port 15 is closed. The oil in the cold oil sump is cooled by air passing through the tubes 30 and the ratio between oil from the cold oil sump and oil from the hot oil sump is regulated to yield oil of the desired viscosity by control of the valve 21 by the viscosity meter 22.

The oil returned through the pipes 35 to the cold oil sump is caused to travel a tortuous path past the cooling tubes by the baffles 29, thus effecting cooling of the oil. The holes 38 permit the passage of a small amount of oil, but the major portion of the oil follows the path between the baffles. In the event that the oil level in the pan drops below the tops of the baffles, the holes 38 will pass sufficient oil for proper supply to the bearings.

Should the level of oil in the hot oil sump drop below the inner ends of the pipes 35 before the valve 21 is actuated to open the port 16, air will be admitted to the tubes 35 and thus permit oil to flow from the cold oil sump through the holes 36 into the hot oil sump, thus preventing any possibility of starving the bearings so long as there is oil in the cold oil sump. If the oil in the cold oil sump is too viscous to flow through the holes 36 readily, the check valve 37 permits the required flow of oil.

I claim:

1. In the lubricating system of an automotive combustion engine, a pan, a partition dividing said pan into a cold oil sump and a hot oil sump, pump means for withdrawing oil from said sumps and supplying the same to the bearings, and valve means responsive to the viscosity of oil supplied to the bearings for regulating the ratio of oil drawn by said pump from said sumps.

2. In the lubricating system of an automotive combustion engine, a pan, a partition dividing said pan into a cold oil sump and a hot oil sump, pump means for withdrawing oil from said sumps and supplying the same to the bearings, valve means responsive to the viscosity of oil supplied to the bearings for regulating the ratio of oil drawn by said pump from said sumps, and means to supply oil from the hot oil sump to the cold oil sump.

3. In the lubricating system of an automotive combustion engine, an oil pan, a partition dividing the same into a cold oil sump and a hot oil sump, a valve box having inlet ports communicating with said sumps, a connection between said valve box and the inlet of said pump, a conduit for supplying oil from said pump to the engine bearings, a valve in said valve box for controlling said inlet ports, and means responsive to the viscosity of oil in said conduit for actuating said valve.

4. In the lubricating system of an automotive combustion engine, an oil pan, a partition dividing the same into a cold oil sump and a hot oil sump, a valve box having inlet ports communicating with said sumps, a pump connection between said valve box and the inlet of said pump, a conduit for supplying oil from said pump to the engine bearings, a valve in said valve box for controlling said inlet ports, means responsive to the viscosity of oil in said conduit for actuating said valve, and means to supply oil from the hot oil sump to the cold oil sump.

5. In the lubricating system of an automotive combustion engine, an oil pan, a partition dividing said oil pan into a cold oil sump and a hot oil sump, pump means for withdrawing oil from said sumps and supplying the same to the bearings, valve means responsive to the viscosity of oil supplied to the bearings for regulating the ratio of oil drawn by said pump from said sumps and tubes extending through said cold oil sump for passing air into indirect heat exchange relation with oil contained in the pan.

6. In the lubricating system of an automotive combustion engine, an oil pan, a partition dividing said oil pan into a cold oil sump and a hot oil sump, pump means for withdrawing oil from said sumps and supplying the same to the bearings, valve means responsive to the viscosity of oil supplied to the bearings for regulating the ratio of oil drawn by said pump from said sumps, tubes extending through said cold oil sump for passing air into indirect heat exchange relation with oil contained in the pan, and means to supply oil from the hot oil sump to the cold oil sump.

7. In the lubricating system of an automobile engine, an oil pan, a partition dividing the same into a cold oil sump and a hot oil sump, pump means for withdrawing oil from said sumps and supplying the same to the bearings, valve means responsive to the viscosity of oil supplied to the bearings for regulating the ratio of oil drawn by the pump from said sumps, tubes extending transversely through said cold oil sump for passing air into indirect heat exchange relation with oil contained in the pan, means for directing air through said tubes upon forward movement of the automobile, and means for supplying oil from said hot oil sump to said cold oil sump.

8. In the lubricating system of an automobile engine, an oil pan, a partition dividing the same into a lower cold oil sump and an upper hot oil sump, said partition being offset centrally to form a well extending into the cold oil sump, pump means for withdrawing oil from said well and from the central portion of said cold oil sump, means responsive to the viscosity of oil supplied to the bearings for regulating the ratio of oil drawn by the pump from said sumps, tubes extending transversely through said pan for passing air into indirect heat exchange relation with the oil contained in the pan, means for directing air through said tubes upon forward movement of the automobile, and means for supplying oil from the hot oil sump to the ends of the cold oil sump.

9. In the lubricating system of an automobile engine, an oil pan, a partition dividing the same into a lower cold oil sump and an upper hot oil sump, said partition being offset centrally to form a well extending into the cold oil sump, pump means for withdrawing oil from said well and from the central portion of said cold oil sump, means responsive to the viscosity of oil supplied to the bearings for regulating the ratio of oil drawn by the pump from said sumps, tubes extending transversely through said pan for passing air into indirect heat exchange relation with the oil contained in the pan, means for directing air through said tubes upon forward movement of the automobile, means for supplying oil from the hot oil sump to the ends of the cold oil sump, and baffle plates defining a tortuous path from the ends to the central portion of the cold oil sump.

10. In the lubricating system of an automotive combustion engine, an oil pan, a partition dividing the same into a lower cold oil sump and an upper hot oil sump, said partition being offset centrally to form a well extending into the cold oil sump, pump means for withdrawing oil from said well and from the central portion of said cold oil sump, means responsive to the viscosity of oil supplied to the bearings for regulating the ratio of oil drawn by the pump from said sumps, tubes extending through said pan for passing air into indirect heat exchange relation with the oil contained in the pan, and pipes leading from said well to the ends of the cold oil sump.

11. In the lubricating system of an automobile engine, an oil pan, a partition dividing the same into a lower cold oil sump and an upper hot oil sump, said partition being offset centrally to form a well extending into the cold oil sump, pump means for withdrawing oil from said well and from the central portion of said cold oil sump, means responsive to the viscosity of oil supplied to the bearings for regulating the ratio of oil drawn by the pump from said sumps, tubes extending transversely through said pan for passing air into indirect heat exchange relation with the oil contained in the pan, means for directing air through said tubes upon forward movement of the automobile, and pipes leading from said well to the ends of the cold oil sump.

12. In the lubricating system of an automobile engine, an oil pan, a partition dividing the same into a lower cold oil sump and an upper hot oil sump, said partition being offset centrally to form a well extending into the cold oil sump, pump means for withdrawing oil from said well and from the central portion of said cold oil sump, means responsive to the viscosity of oil supplied to the bearings for regulating the ratio of oil drawn by the pump from said sumps, tubes extending transversely through said pan for passing air into indirect heat exchange relation with the oil contained in the pan, means for directing air through said tubes upon forward movement of the automobile, pipes leading from the well to the ends of the cold oil sump, and baffle plates defining a tortuous path from the ends to the central portion of the cold oil sump.

13. In the lubricating system of an automotive combustion engine, an oil reservoir, a heat exchange device communicating with said reservoir, a pump having its inlet communicating both with said reservoir and said heat exchange device, valve means controlling flow to said pump from said reservoir and heat exchange device, and means responsive to the viscosity of oil discharged by said pump for actuating said valve means.

14. In the lubricating system of an automotive engine, an oil reservoir, a heat exchange device communicating with said reservoir, a pump having its inlet communicating both with said reservoir and said heat exchange device, valve means controlling flow to said pump from said reservoir and heat exchange device, means responsive to the viscosity of oil discharged by said pump for actuating said valve means, and means for directing air through said heat exchange device on forward movement of the engine.

15. In the lubricating system of an automotive combustion engine, an oil reservoir, a heat exchange device, a pump having inlet connections for drawing oil from said reservoir direct and through said heat exchange device, an outlet connection for supplying oil to the bearings, and viscosity responsive means connected to said outlet connection for operation on by oil flowing therein and operative to control flow of oil through said inlet connections.

16. In the lubricating system of an automotive combustion engine, an oil reservoir, a heat exchange device, a pump having inlet connections for drawing oil from said reservoir direct and through said heat exchange device, an outlet connection for supplying oil to the bearings, valve means for controlling flow through said inlet connections, and viscosity responsive means connected to said outlet connection for operation upon by oil flowing therein and operative to actuate said valve means.

17. In the lubricating system of an automotive combustion engine, an oil reservoir, a heat exchange device, a pump having inlet connections for drawing oil from said reservoir direct and through said heat exchange device, an outlet connection for supplying oil to the bearings, valve means for controlling flow through said inlet connections comprising a casing having inlet ports and an outlet port, a valve member movable back and forth therein, a viscosity responsive device connected to said outlet connection for operation upon by fluid flowing therein and including a chamber wherein the pressure of the fluid flowing therethrough varies with its viscosity, a pipe connecting said chamber and said casing whereby pressure developed in said chamber is applied to said valve member to move it in one direction, and yielding means opposing such movement of said valve member.

18. In the lubricating system of an automotive engine, an oil reservoir, a heat exchange device, a pump having inlet connections for drawing oil from said reservoir direct and through said heat exchange device, an outlet connection for supplying oil to the bearings, viscosity responsive means connected to said outlet connection for operation on by oil flowing therein and operative to control flow of oil through said inlet connections, said heat exchange device being so arranged that air is caused to flow therethrough upon forward movement of the engine.

19. In the lubricating system of an internal combustion engine, two oil sumps, cooling means in one sump, pump means for withdrawing oil from said sumps and supplying the same to the bearings, and valve means responsive to the viscosity of oil supplied to the bearings for regulating the ratio of oil drawn by said pump from said sumps.

20. In the lubricating system of an automotive combustion engine, two oil sumps, means in one sump for cooling the oil therein, pump means for withdrawing oil from said sumps and supplying the oil to the bearings and valve means responsive to the viscosity of oil supplied to the bearings for regulating the ratio of oil drawn by said pump from said sumps.

21. In the lubricating system of an automotive combustion engine, a first oil sump, a second oil sump communicating therewith, said first oil sump being arranged to collect oil dripping from the bearings and said second sump containing cooling means, pump means for withdrawing oil from said sumps and supplying the same to the bearings, and valve means responsive to the viscosity of oil supplied to the bearings for regulating the ratio of oil drawn by said pump from said sumps.

22. In the lubricating system of an automotive combustion engine, an oil pan, a generally horizontal partition in said pan in position to collect oil dropping from the engine bearings, said partition dividing said pan into a first and a second oil sump, cooling means in said second sump, means for supplying oil from the first oil sump to the second oil sump, pump means for withdrawing oil from said sumps and supplying the same to the bearings, and valve means responsive to the viscosity of the oil supplied to the bearings for regulating the ratio of oil drawn by said pump from said sumps.

23. In the lubricating system of an automotive combustion engine, an oil pan, a generally horizontal partition in said pan in position to collect oil dropping from the engine bearings, said partition dividing said pan into a first and a second oil sump, cooling means in said second sump, means for supplying oil from the first oil sump to the second oil sump, pump means for withdrawing oil from said sumps and supplying the same to the bearings, valve means responsive to the viscosity of the oil supplied to the bearings for regulating the ratio of oil drawn by said pump from said sumps.

HARRY T. BOOTH.